United States Patent Office 3,476,787
Patented Nov. 4, 1969

3,476,787
TRILAURYLAMINE EXTRACTION OF PLUTONIUM WITH PRECIPITATION IN OXALIC ACID
André Bathellier, Sceaux, France, assignor to Commissariat a l'Energie Atomique, Paris, France
Filed Aug. 18, 1965, Ser. No. 480,732
Claims priority, application France, Aug. 25, 1964, 986,093
Int. Cl. C07f *15/00;* C22b *61/04;* B01d *11/00*
U.S. Cl. 260—429.1                             2 Claims

ABSTRACT OF THE DISCLOSURE

Plutonium is extracted in an organic phase consisting of trilaurylamine diluted in a solvent and reextracted by a sulphuric acid solution. The plutonium is then precipitated in the presence of oxalic acid, the mother liquor of which is recycled directly at the level of plutonium purification by trilaurylamine extraction without previous evaporation.

---

Figure 1:
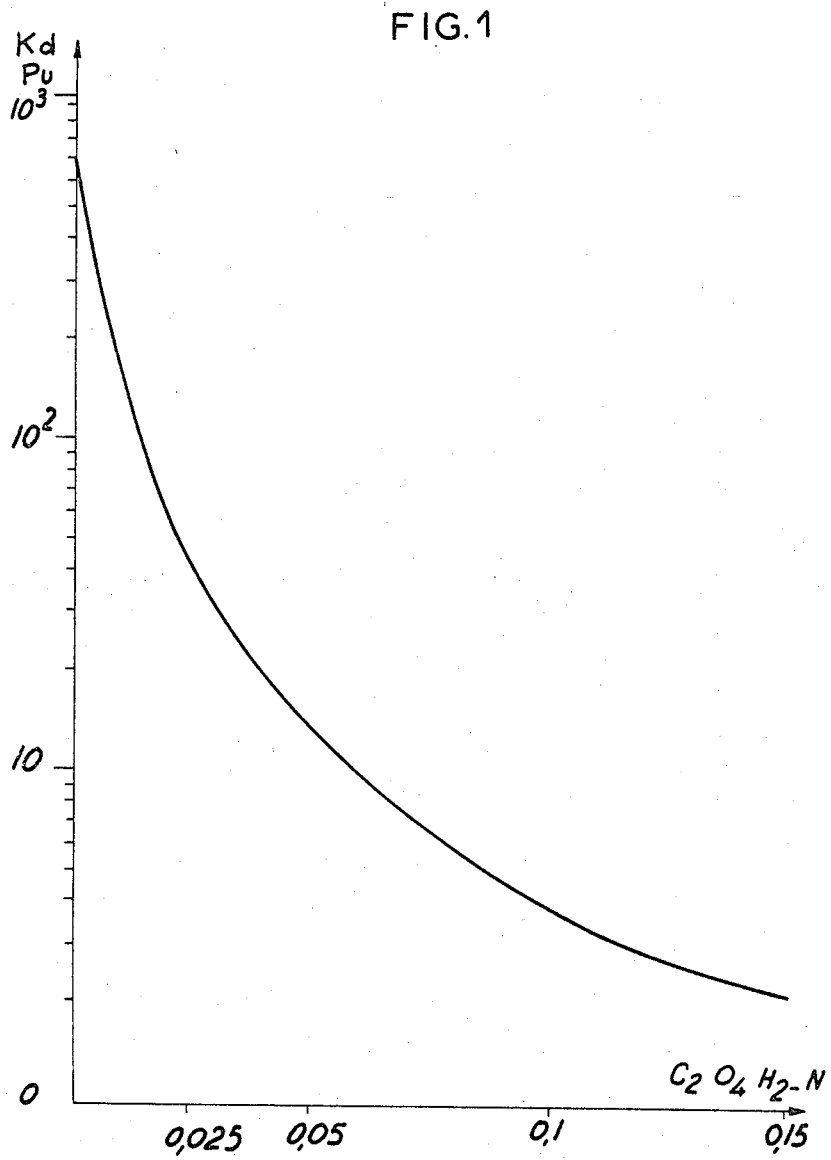

The last stages of purification of plutonium by solvent extraction usually consist in passing the plutonium contained in an organic phase such as trilaurylamine into an aqueous acid phase such as a sulphuric or sulpho-nitric acid solution and in precipitating the plutonium by addition of oxalic acid. However, precipitation is not complete and plutonium in not negligible quantities still remains in solution in the mother-liquors.

The recovery of plutonium contained in the mother-liquors presents a difficult problem. The presence in the mother-liquor both of sulphuric acid on the one hand and of oxalic acid on the other hand makes it difficult to recover plutonium by extraction. In fact, it is known that the sulphuric and oxalic ions form with plutonium unextractable complexes. It is therefore necessary to eliminate or at least to minimize their influence. With this object in mind, a number of solutions have been put forward:

To increase the acidity to 8 N by addition of highly concentrated nitric acid,

To destroy the oxalic acid by nitric-acid oxidation and concentration of the mother-liquors.

The first solution has the disadvantage of introducing substantial quantities of nitric acid and the second solution has a disadvantage in that it requires an evaporator which is consequently subject to rapid corrosion by the sulphuric acid which is present, thereby entailing the need for periodical replacement.

This invention is directed to a method for reprocessing the mother-liquors derived from the oxalic-acid precipitation of plutonium which overcomes the disadvantages referred-to above. Said mother-liquors are obtained after re-extraction of plutonium from an organic phase consisting of trilaurylamine which may be diluted in a solvent by a sulphuric acid solution and precipitation of the plutonium by addition of oxalic acid.

The method according to the invention consists in recycling the mother-liquors derived from the oxalic-acid precipitation of plutonium directly at the level of the trilaurylamine extraction without any previous treatment.

The inventor has found that, when the mother-liquors obtained from the precipitation of plutonium by oxalic acid are recycled at the level of the purification by trilaurylamine extraction, there could result a sufficient dilution to ensure that the unfavorable action of the sulphate and oxalate ions is considerably reduced. The plutonium-containing solutions which are subjected to purification by trilaurylamine are derived, for example, from the dissolution of nuclear fuels or plutonium slags obtained at the time of reduction of plutonium fluoride by an alkaline-earth metal and dissolved in nitric acid.

If $V_1$, $V_2$ and $V_3$ designate respectively the volumes of solution containing plutonium prior to extraction, after re-extraction and after precipitation of the oxalate (volume of mother-liquors), then there is in all cases $V_3 > V_2$ but the ratio $V_1/V_3$ which is variable according to the operating conditions always remains distinctly higher than 5:1. Consequently, if $V_3$ is recycled in $V_1$, there is obtained a volume $V'_1 = V_1 + V_3$ in which the sulphuric acid concentration and oxalic acid concentration have been divided by at least 6. Such solutions can be extracted directly with trilaurylamine.

Figure 2:
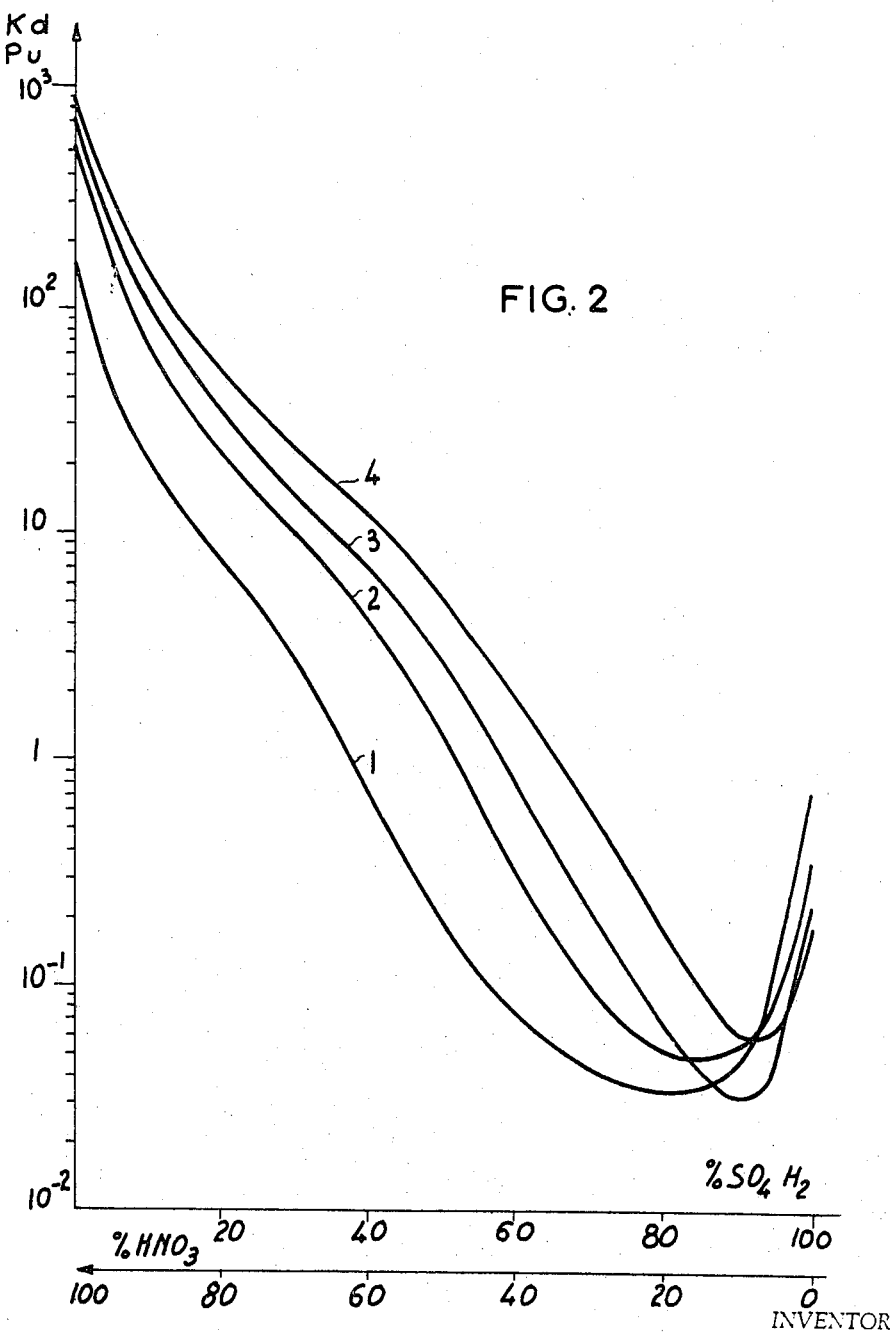

While the experimental curve shown in FIG. 1 shows that the partition coefficient between trilaurylamine diluted to 20% in dodecane and a 2 N nitric acid solution still remains sufficient in the case of low concentrations of oxalic acid (0.05 N) in the nitric acid phase, it was nevertheless by no means certain that the combined action of $C_2O_4^{-2}$ and $SO_4^{-2}$ anions would not appreciably modify the partition coefficients. The following example will in fact show that the mother-liquors can be directly recycled at the level of purification by trilaurylamine extraction without thereby impairing the extraction capacity of the organic phase to any substantial extent. FIG. 2 is an analysis of the variations in partition coefficients of plutonium 4+ between trilaurylamine diluted to 20% in dodecane and sulpho-nitric acid solutions of variable composition. Curves 1, 2, 3 and 4 correspond respectively to total acidities of 0.5 N, 1 N, 1.5 N and 2 N.

It can be seen from these curves that, in the case of a total acidity in the range of 0.5 N to 2 N, the partition coefficients can be considered as acceptable if the sulphuric acidity does not exceed 20% of the total acidity.

In accordance with a characteristic arrangement of the invention, if the oxalic acid content in the mother-liquors were to exceed a concentration of 0.12 M—which can arise only accidentally—the oxalic acid concentration in these mother-liquors being as a rule in the vicinity of 0.04 M, ferric nitrate is accordingly added to said mother-liquors in order to forestall any danger of precipitating plutonium oxalate at the time of recycling.

Figure 3:
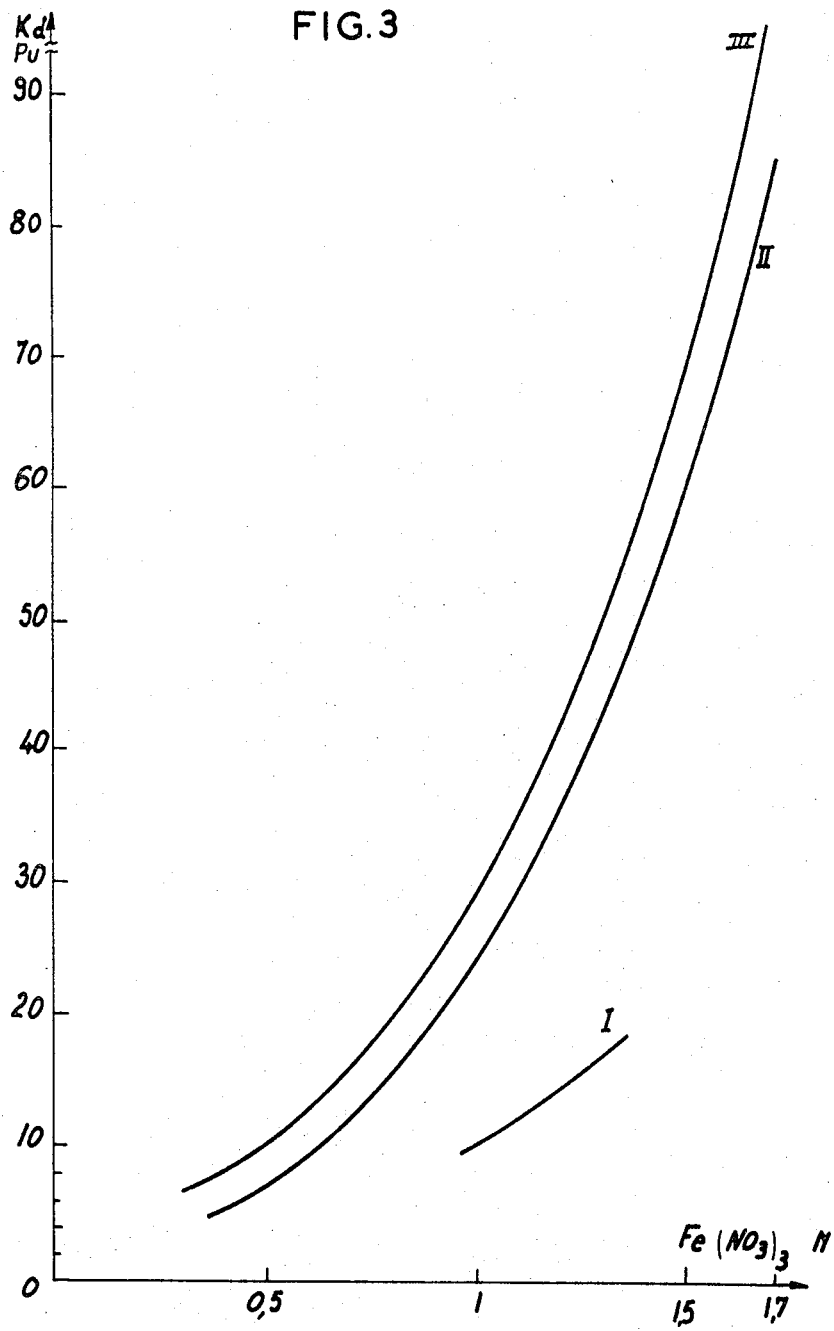

It is of interest to note that the addition of ferric nitrate offers another advantage in that it increases the distribution coefficient of plutonium and facilitates its extraction as shown by the curves of FIG. 3. Curves I, II and III of this figure represent the variations of the partition coefficients of plutonium (4+) between an organic phase consisting of trilaurylamine diluted to 20% in dodecane and sulpho-nitric acid solutions which have oxalic acid concentrations respectively of 0.5 N, 0.1 N and 0.05 N. It can be seen in particular that the partition coefficients in the case of a plutonium-containing solution having a 0.1 N oxalic acid concentration must be multipled by a factor of 2.5 when the ferric nitrate concentration increases from 1 to 1.5 N.

There will now be given solely by way of explanatory illustration one example of application of the method for reprocessing mother-liquors of oxalic-acid precepitation of plutonium in accordance with this invention. The practical arrangements which will be described in connection with this example must be considered as forming part of the invention, it being understood that any equivalent arrangements can equally well be adopted without thereby departing from the scope of the invention.

EXAMPLE

The initial solution employed contained: Pu, 1.13 g./l.; $HNO_3$, 2.5 N; $H_2SO_4$, 0.15 M; $H_2C_2O_4$, 0.008 M, corresponding to a mother-liquor of oxalic precipitation of plutonium which is recycled at the level of the purification by trilaurylamine extraction.

This solution was delivered at a rate of 16.5 volumes per hour into a bank of mixer-settlers comprising 3 washing stages and 9 extraction stages having a total volume of 1 liter. The solution was extracted by 10 volumes per hour of trilaurylamine diluted to 20% in dodecane. The solvent washing was carried out by 7 volumes per hour of 0.5 N $HNO_3$.

After dynamic and chemical balancing of the mixer-settler bank, and profile of concentrations of plutonium and of free acidity in the different stages of the bank appeared as follows:

|  | No. of stage | Plutonium mg./l. Solvent | Plutonium mg./l. Aqueous solvent | Pu partition coefficient | N free acidity Solvent | N free acidity Aqueous solvent |
|---|---|---|---|---|---|---|
| Extraction | 1 | 2 | 0.4 | 5 | 0.096 | 2.48 |
|  | 2 | 3 | 0.4 | 7.7 | 0.143 | 2.26 |
|  | 3 | 3.7 | 0.64 | 5.6 | 0.144 | 2.60 |
|  | 4 | 20 | 1 | 20 | 0.145 | 2.66 |
|  | 5 | 27 | 1.6 | 17 | 0.146 | 2.70 |
|  | 6 | 74 |  |  | 0.146 | 2.65 |
|  | 7 | 260 | 20 | 13 | 0.146 | 2.50 |
|  | 8 | 1,000 | 54 | 18.5 | 0.143 | 2.74 |
|  | 9 | 2,100 | 230 | 9.3 | 0.109 | 3.06 |
| Washing of loaded solvent | 10 | 1,800 | 32 | 56 | 0.065 | 1.06 |
|  | 11 | 1,800 | 32 | 56 | 0.040 | 0.66 |
|  | 12 | 1,800 | 20 | 90 | 0.027 | 0.5 |

Figure 4:
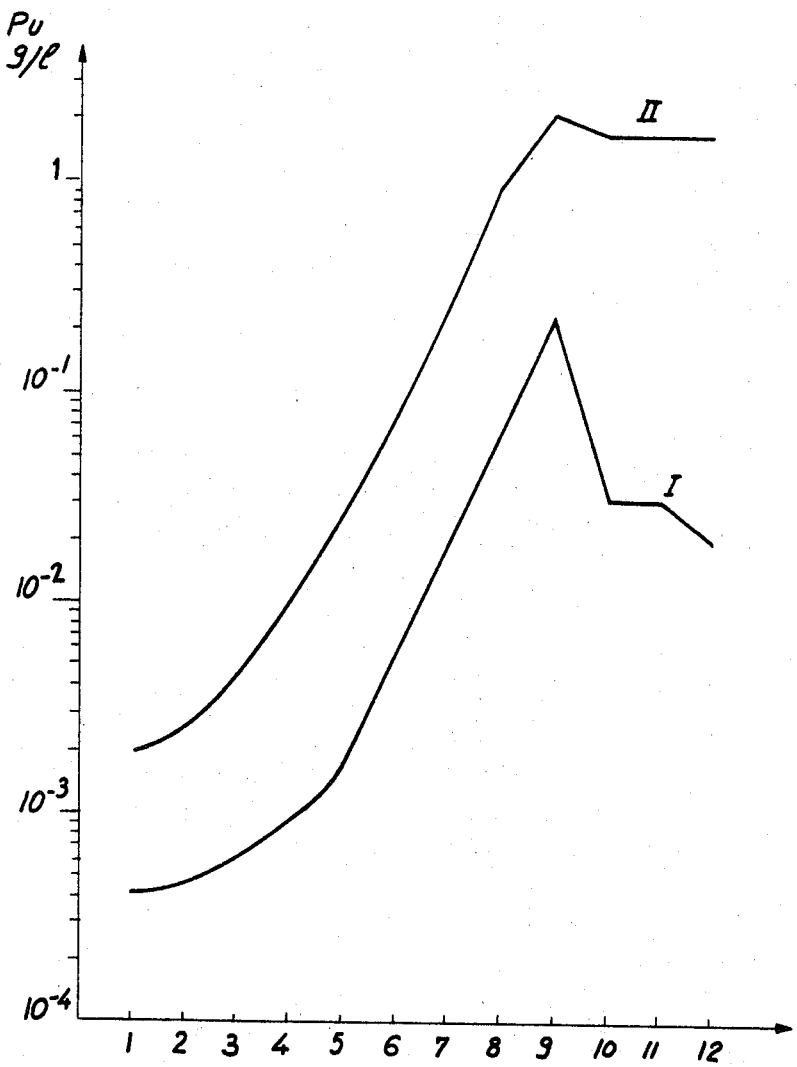
Figure 5:
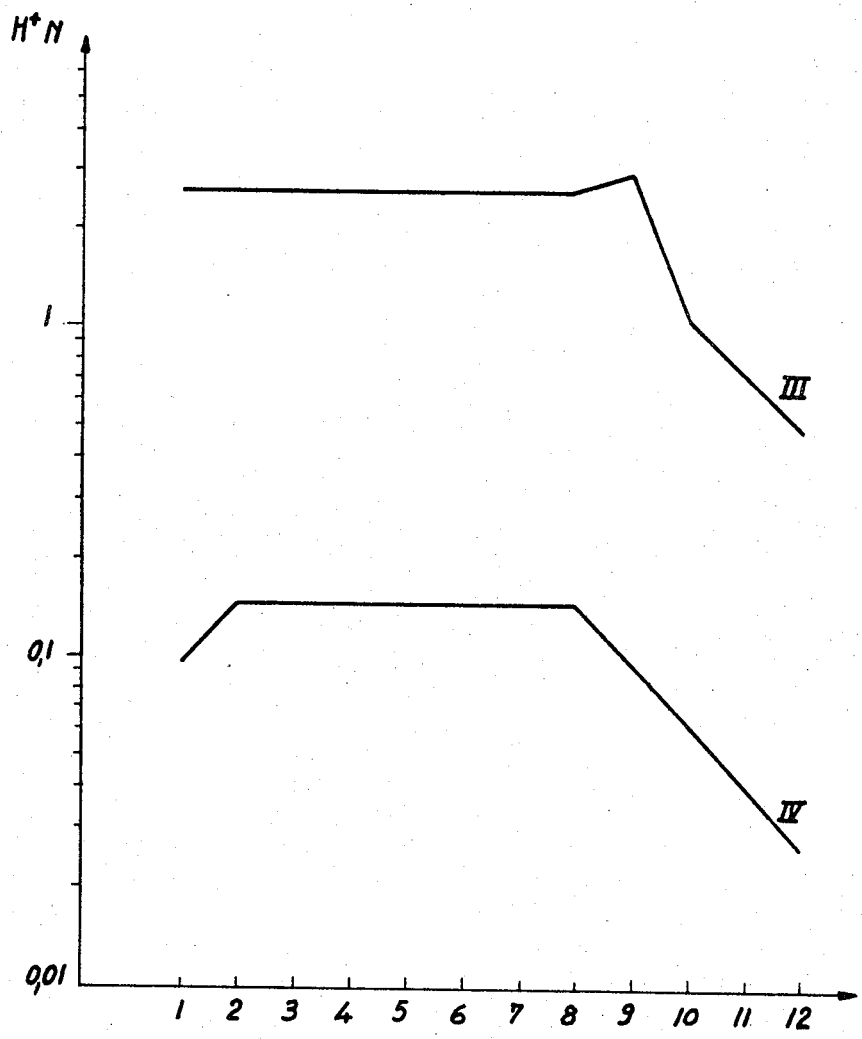

Curves I and II of FIG. 4 represent respectively the profile of plutonium concentrations in the aqueous phase and in the organic phase, curves III and IV of FIG. 5 represent the profile of free acidity concentrations in these same phases.

It is apparent from these results that:

The loss of plutonium at the end of the extraction process is less than $5.10^{-4}$, The acidity of the loaded solvent delivered from the extraction process is low (0.027 N) and compatible with a good re-extraction of plutonium, While the distribution coefficients of plutonium, which increase from 5 to 18 in the extraction process and from 56 to 90 in the washing process, are lower (by approximately a factor of 2) than the coefficients obtained in the method of concentration of the mother-liquors, they are nonetheless wholly sufficient to ensure good operation of the extraction process.

This example shows that the mother-liquors derived from the precipitation of plutonium by oxalic acid can be recycled directly without previous evaporation at the level of the purification by trilaurylamine extraction; an economy is thus achieved by dispensing with the need for an evaporator and the resulting periodical replacement of this latter.

What I claim is:

1. Method for reprocessing mother-liquors obtained after re-extraction of plutonium by a sulphuric acid solution from an organic phase consisting of trilaurylamine diluted in a solvent, by oxalic acid precipitation of the plutonium contained in said solution, characterized in that said mother-liquors are recycled directly at the level of the plutonium purification by trilaurylamine extraction without previous evaporation.

2. Method in accordance with claim 1, characterized in that ferric nitrate is added to the mother-liquors when the oxalic acid concentration in said mother-liquors is higher than 0.12 M.

References Cited

UNITED STATES PATENTS

| 2,882,124 | 4/1959 | Seaborg | 23—312 |
| 2,901,313 | 8/1959 | Maddock | 23—312 |
| 2,902,454 | 9/1959 | Moore | 23—312 |
| 2,905,525 | 9/1959 | Dawson | 23—312 |
| 3,047,360 | 7/1962 | Sheppard | 23—312 |
| 3,147,292 | 9/1964 | Clellano | 23—312 |
| 3,154,377 | 10/1964 | Chesne | 23—312 |

NORMA YUDKOFF, Primary Examiner

V. W. PRETKA, Assistant Examiner

U.S. Cl. X.R.

23—299, 300, 305, 312, 340, 344